United States Patent [19]

Colpaert

[11] 4,374,554
[45] Feb. 22, 1983

[54] DUO-SERVO DRUM BRAKE

[75] Inventor: James J. Colpaert, Granger, Ind.

[73] Assignee: The Bendix Corporation, Southfield, Mich.

[21] Appl. No.: 193,851

[22] Filed: Oct. 3, 1980

[51] Int. Cl.³ .................. F16D 51/24; F16D 65/24
[52] U.S. Cl. .............................. 188/106 A; 188/364
[58] Field of Search .............. 188/79.5 GE, 79.5 GC, 188/196 BA, 206 R, 331, 335, 363, 364, 106 A, 106 F

[56] References Cited

U.S. PATENT DOCUMENTS

| | | | |
|---|---|---|---|
| 2,060,909 | 11/1936 | Taylor | 188/331 |
| 2,192,004 | 2/1940 | Burger | 188/106 A |
| 2,296,673 | 9/1942 | Hunyady | 188/335 |
| 2,833,378 | 5/1958 | Main | 188/364 X |
| 3,199,639 | 8/1965 | Newton | 188/331 X |
| 3,221,842 | 12/1965 | Shampton | 188/79.5 GC |
| 4,180,149 | 12/1979 | Johannesen et al. | 188/335 X |

*Primary Examiner*—Duane A. Reger
*Attorney, Agent, or Firm*—Ken C. Decker; Paul D. Schoenle

[57] ABSTRACT

A drum brake (10) includes a light-weight backing plate (12) which carries a pair of brake shoes (44, 46). The backing plate comprises a pair of stamped plates (18,20) having a plurality of radially extending arms (22-28) which cooperate to guide the brake shoes. A hydraulic actuator (68) is carried by the brake shoes to move the shoes into engagement with a brake drum (66). A light-weight dust shield (82) cooperates with the brake drum to inhibit the entry of dirt into the brake. The actuator (68) carries a parking lever (94) and cooperates with the lever to effect a parking brake application responsive to pivoting of the lever. An adjustable strut (62) spaces apart the brake shoes. An automatic adjusting mechanism (106) cooperates with the strut to maintain a substantially constant running clearance between the brake shoes and the brake drum.

1 Claim, 5 Drawing Figures

DUO-SERVO DRUM BRAKE

The invention relates to a drum brake of a servo type.

Drum brakes of the servo type include a pair of arcuate brake shoes which are carried by a backing plate. The brake shoes have pairs of confronting ends. An anchor pin secured to the backing plate pivotally anchors one pair of confronting brake shoe ends to the backing plate. An actuator is carried by the backing plate adjacent the anchor pin. The actuator cooperates with the one pair of confronting brake shoe ends to expand the brake shoes into engagement with a rotatable brake drum. The brake shoes carry a friction lining which frictionally engages the brake drum so as to retard rotation of the brake drum. A strut is received between the other pair of confronting brake shoe ends. The strut transfers brake torque from one brake shoe to the other during a brake application. Consequently, brake torque developed by one brake shoe is transferred by the strut to the other brake shoe to urge the other brake shoe into tighter engagement with the brake drum. Brake torque developed by both brake shoes is transferred by the other brake shoe to the anchor pin. In order to compensate for wear of the friction linings, the strut is adjustable. An adjusting mechanism cooperates with the strut and with the brake shoes and anchor pin to adjust the strut so that the movement of the brake shoes relative to the anchor pin upon a brake application is maintained substantially constant. In this way, the running clearance between the friction linings and brake drum is maintained substantially constant.

Servo drum brakes known in the art generally include an annular backing plate which is stamped from sheet metal. This backing plate carries a hydraulic actuator and the anchor pin. Additionally, the circular periphery of the backing plate cooperates with the brake drum to shield the brake from moisture and dirt. In order to provide the requisite strength, the backing plate must be formed of relatively thick material. Consequently, the backing plate is a heavy component part of the brake.

A servo drum brake is known in accordance with the U.S. Pat. No. 3,109,519 issued Nov. 5, 1963, to Dombeck in which the backing plate includes a pair of axially spaced annular plates. The annular plates cooperate to define a radially-extending slot for the backing plate. A radially-extending web is defined by each of a pair of brake shoes. The webs of the pair of brake shoes are slidably received in the slot of the backing plate. In order to move the pair of brake shoes into engagement with a brake drum, the backing plate rotatably carries a cam member which engages the pair of brake shoes. The backing plate defines a pair of apertures adjacent the cam member. Each brake shoe web defines a slot which aligns with one of the apertures in the backing plate. An anchor bolt is received in each of the apertures of the backing plate. The rake shoes anchor to the backing plate via the anchor bolts. Additionally, the anchor bolts secure a strap member to the backing plate. The strap member rotatably supports one end of a cam shaft which drives the cam member.

With a drum brake of the kind illustrated in the patent to Dombeck, the actuator (the cam shaft and cam member) is carried by the backing plate. Consequently, the backing plate must include structure to support the actuator. The structure which is needed to support the actuator adds weight to the backing plate. Additionally, when the brake shoes are to be replaced, the anchor bolts must be removed from the apertures in the backing plate in order to allow the brake shoes to be removed from heir slots on the backing plate. Because the anchor bolts also secure the strap member to the backing plate, replacing the brake shoes requires the disassembly of many component parts of the brake.

The invention as claimed is intended to avoid the drawbacks of prior servo drum brakes by providing a brake wherein the backing plate is a light-weight component. The backing plate carries the brake shoes and transfers braking torque from the brake shoes to a contiguous part of the vehicle. A light-weight dust shield cooperates with the brake drum to provide environmental protection for the brake. The hydraulic actuator, instead of being mounted on the backing plate, is carried between one pair of confronting brake shoe ends. In order to pivotally connect the brake shoes with the backing plate, each of the brake shoes carries a pin. The backing plate defines a pair of spaced apart pockets adjacent the actuator. The pins of the brake shoes are received in respective pockets to pivotally anchor each brake shoe to the backing plate. A parking lever is pivotally carried by the hydraulic actuator. The parking lever cooperates with one of the brake shoes to move the shoe into engagement with the brake drum to effect a parking brake application. Reaction forces from the parking lever, acting through the actuator, move the other brake shoe into engagement with the brake drum. The brake includes an adjustable strut between the other pair of confornting brake shoe ends. An adjusting mechanism for the strut includes a pawl lever which is pivotally carried by one of the brake shoes adjacent the strut. The pawl lever cooperates with the bracking plate so that the pawl lever is pivoted relative to the strut upon a brake application with the brake drum rotating in one direction of rotation. If an adjustment of the strut is required, the pawl lever engages a successive tooth of a ratchet wheel on the strut. The pawl lever rotates the ratchet wheel to elongate the strut.

The advantages offered by the invention are mainly that the brake is lighter than prior drum brakes. Because the dust shield is not a structural component, the dust shield may be fabricated from light-weight plastic or aluminum. The backing plate need not provide a mounting place for the hydraulic actuator because the actuator is carried by the brake shoes. Since the hydraulic actuator also cooperates with the parking brake lever to effect a parking brake application, the parking brake mechanism adds very little weight to the brake. The adjusting mechanism for the strut is inexpensive to manufacture because it includes very few parts. A further advantage follows from the way in which the brake shoes cooperate with the backing plate and with the hydraulic actuator. Because each of the brake shoes pivots about a separate axis relative to the backing plate and actuator, the one pair of confronting brake shoe ends move toward one another as the friction linings on the brake shoes wear. Consequently, and in contrast to prior drum brakes, the liquid volume of the hydraulic actuator decreases as the friction linings wear. It follows from this feature of the invention that a smaller brake fluid reservoir is acceptable on vehicles equipped with drum brakes according to the invention than has been acceptable with prior drum brakes. If the fluid level in the reservoir is satisfactory when the friction linings are new, the level will not decrease during the life of the brake shoes as the friction linings wear. In fact, the fluid level in the reservoir will increase due to the decrease in liquid volume of the hydraulic actuator as the friction linings wear.

One way of carrying out the invention is described in detail below with reference to drawings which illustrate only one specific embodiment, in which.

Figure 2:
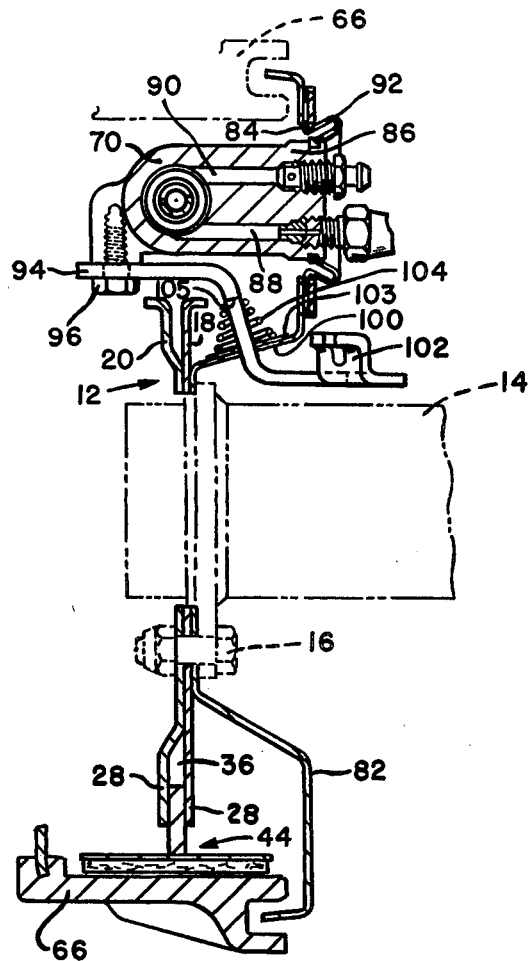
FIG. 2 is a fragmentary, cross-sectional view taken along the line 2—2 of FIG. 1.

With reference to the Figures, a drum brake 10 includes an annular backing plate 12 which is secured to an axle assembly 14 (a portion of which is shown in FIG. 2), by bolts 16.

Figure 1:
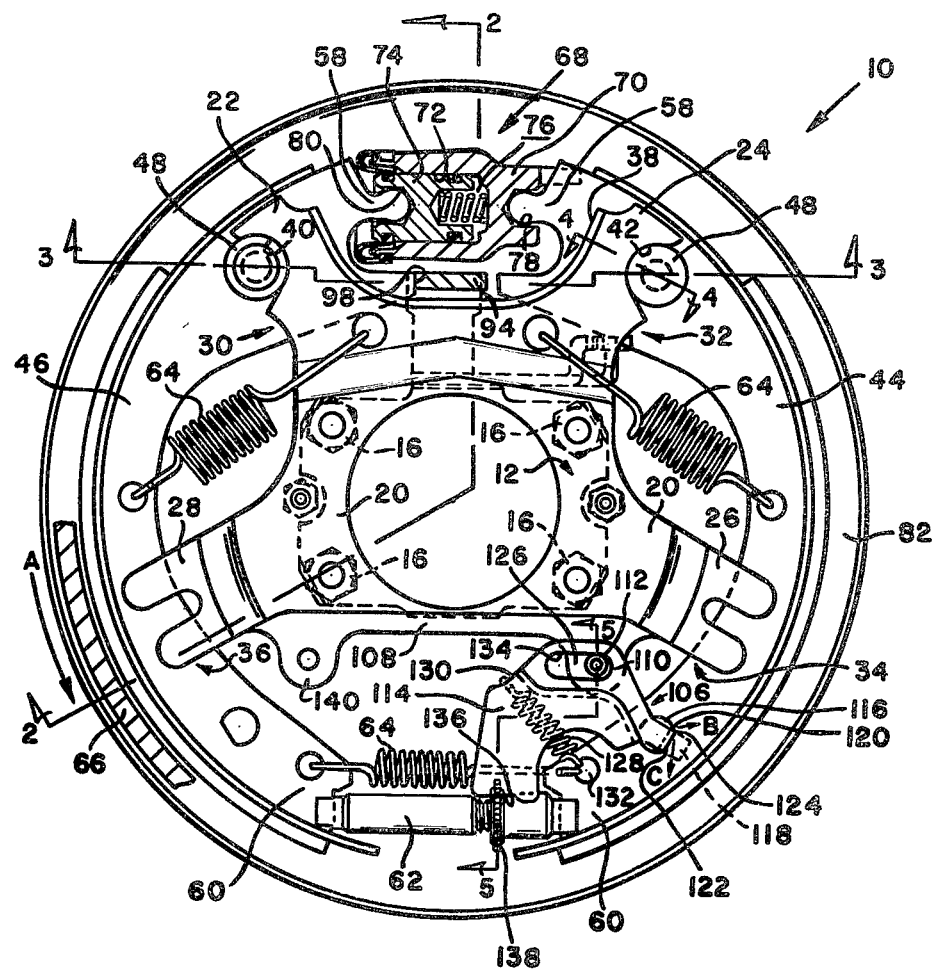
FIG. 1 is a fragmentary view, partly in cross section, of a drum brake according to the invention.

Upon inspection of FIGS. 1 and 2, it will be apparent that the backing plate 12 includes a pair of stamped sheet metal members 18 and 20. Viewing FIG. 1, it will be seen that the members 18 and 20 are substantially similar in shape and that the left and right portions of the backing plate are mirror images of each other. In order to form the backing plate 12, the stamped members 18 and 20 are arranged axially one behind the other, as viewed in FIG. 1, and spot welded together. Each of the members 18 and 20 includes four radially extending arms 22, 24, 26, and 28. Viewing FIG. 2, it will be seen that the arms of member 20 are offset axially rom the arms of member 18. Consequently, the arms 22-28 cooperate to define radially extending slots 30, 32, 34, and 36, one of which, slot 36, is visible in FIG. 2. The arms 22 and 24 are spaced circumferentially apart and define a recess 38 therebetween, viewing FIG. 1. Additionally, the arms 22 and 24 define arcuate pockets, or abutments, 40 and 42, respectively, which are disposed away from the reces 38.

Figure 4:
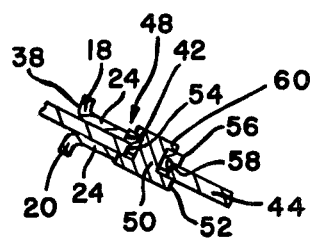
FIG. 4 is a fragmentary, cross-sectional view taken along the line 4—4 of FIG. 1.

A pair of arcuate brake shoes 44 and 46 are slidably received in the slots 32, 34, and 30, 36, respectively. Each of the brake shoes 44 and 46 includes an axially extending trunnion pin 48. Viewing FIG. 4, the pin 48 includes a rivet 50 having a cylindrical head 52 and a ring member 54 having a flange 56. The rivet and ring member are assembled into an aperture 58 in the brake shoe. The rivet is swedged at 60 to form a unitary trunnion assembly. Rivet head 52 and flange 56 have substantially the same outer diameter. In order to pivotally anchor the brake shoes to the backing plate, the trunnion pins 48 of brake shoes 44 and 46 are pivotally received in pockets 42 and 40, respectively.

The arcuate brake shoes 44 and 46 have pairs of confronting brake shoe ends 58 and 60. An adjustable-length strut 62 is received between the confronting brake shoe ends 60. Pull-back springs 64 yieldably maintain the brake shoes 44 and 46 in engagement with the strut 62 and with backing plate 12.

In order to urge the brake shoes 44 and 46 into engagement with a brake drum 66, a hydraulic actuator 68 is carried between the confronting brake shoe ends 58 in the recess 38 of the backing plate 12. The actuator 68 includes a housing 70 which defines a bore 72 therein. A piston 74 is slidably received in the bore 72 and cooperates with the housing 70 to define a variable-volume chamber 76. The housing 70 defines a recess 78 which receives and drivingly engages the end 58 of brake shoe 44. Similarly, the piston 74 defines a recess 80 which receives and drivingly engages the end 58 of brake shoe 46. Consequently, the actuator 68 is carried solely by the confronting ends 58 of the brake shoes 44 and 46.

Figure 3:
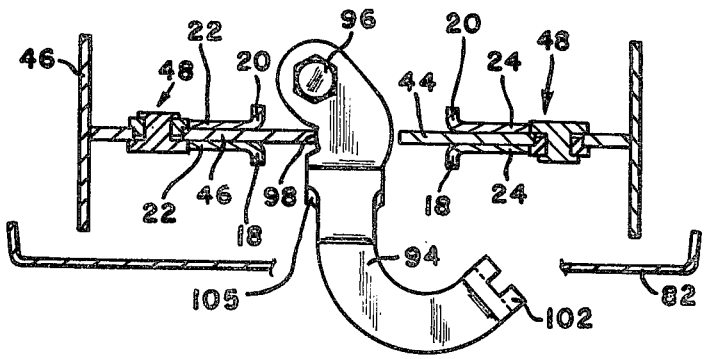
FIG. 3 is a fragmentary, cross-sectional view taken along the line 3—3 of FIG. 1.

Viewing FIGS. 2 and 3, it will be seen that the brake 10 includes a circular dust shield 82 having an aperture 84 therein. The housing 70 of actuator 68 includes an axially extending portion 86 which extends through the aperture 84. Housing portion 86 includes passages 88 and 90 by which fluid may be supplied to and air purged from the chamber 76, respectively. A flexible boot 92 connects the housing portion 86 to the dust shield 82. A parking brake lever 94 is pivotally connected to the actuator housing 70 by a machine screw 96. The lever 94 defines an arcuate abutment 98 which slidably and pivotally engages the brake shoe 46 viewing FIG. 3. In order to pivotally actuate the parking brake lever 94, the lever extends through an aperture 100 in the dust shield 82 and terminates in an end 102 to which a parking brake cable (not shown) is engageable. A movable shield 103 is carried by the parking brake lever and slidably engages the dust shield 82 at the aperture 100 to further provide environmental protection for the brake. A coil spring 104 is carried on the parking brake lever 94. The spring 104 engages the shield 103 to urge the shield into sliding engagement with the dust shield 82. A shoulder 105 on the parking brake lever 94 opposes the upper end of the spring 104.

Figure 5:
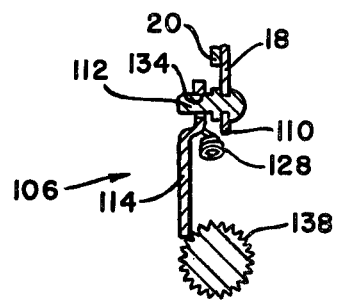
FIG. 5 is a fragmentary, cross-sectional view taken along the line 5—5 of FIG. 1.

Turning again to FIG. 1, it will be seen that the brake 10 includes an automatic adjuster mechanism 106 which cooperates with the strut 62 to compensate for wear of the brake shoes 44 and 46. In order to connect the mechanism 106 to the backing plate 12, the member 18 includes a depending flange 108 which defines an ear 110. A pin 112 projects axially from the ear 110. The mechanism 106 includes a lever 114 which is pivotally connected to the brake shoe 44 at a D-shaped hole 116. A tab 118 extends from the lever 114 axially through the hole 116 and is bent radially outwardly. An edge 120 of the tab 118 cooperates with the straight portion 122 of D-hole 116 to define a pivot point 124 for the lever 114. The lever 114 defines a slot 126 which is received over the pin 112. Consequently, the lever 114 is slidably and pivotally connected to the backing plate 12 via pin 112. A coil spring 128 engages the lever 114 at a recess 130. The lower end of the spring 128 is hooked into an aperture 132 in the brake shoe 44. As a result, the tab 118 is biased into engagement with the straight portion 122 of D-hole 116 and the edge 134 of slot 126 engages the pin 112. The lever 114 defines a pawl edge 136 which drivingly engages a ratchet wheel 138 of the strut 62, viewing FIG. 5. Rotation of the ratchwet wheel 138 extends the strut 62 to adjustably space apart the confronting brake shoe ends 60 of brake shoes 44 and 46.

When a brake application is effected, pressurized fluid is admitted to the chamber 76 via passage 88. As a result, the actuator 68 expands circumferentially. Because the actuator 68 is carried solely by the brake shoes 44 and 46, the actuator applies equal and opposite forces to the brake shoes 44 and 46. As a result, the brake shoes pivot radially outwardly into engagement with the brake drum 66.

When a brake application is effected with the brake drum 66 rotating in a direction corresponding to forward vehicle movement, as is indicated by Arrow A in FIG. 1, the brake shoes are carried in the direction of brake drum rotation so that the brake shoe 44 anchors to the backing plate 12 via its trunnion pin 48 and pocket 42. Brake torque developed by the brake shoe 46 is transferred via strut 62 to the brake shoe 44, urging brake shoe 44 into tighter engagement with the brake drum 66. Brake torque developed by both of the brake shoes is transferred to backing plate 12 via pocket 42 in the arms 24. The pin 48 of brake shoe 46 is spaced from its respective pocket 40 because brake shoe 46 is carried circumferentially in the direction of Arrow A.

Because the brake shoe 44 pivots radially outwardly into engagement with the brake drum 66, all points on the brake shoe 44 move along arcs which are centered at the pin 48 in pocket 42. Consequently, the end 60 of brake shoe 44 moves circumferentially to the right, viewing FIG. 1. Additionally, the strut 62 follows the end 60 of brake shoe 44 because the brake shoe 46 moves circumferentially in the direction of Arrow A. As a result, the pivot point 124 for lever 114 in D-hole 116 moves in the direction represented by Arrow B, viewing FIG. 1. Because the movement of point 124 is nearly parallel to slot 126, the lever 114 slides radially outwardly along the pin 112. Consequently, there is no significant pivotal movement of the lever 114 relative to the strut 62.

Conversely, when a brake application is effected with the brake drum 66 rotating in the direction opposite Arrow A, the brake shoe 46 anchors on arms 22 of the backing plate 12 via pin 48 in pocket 40. The brake shoe 44 moves radially outwardly and circumferentially in the direction of brake sdrum rotation. Consequently, the point 124 moves in the direction indicated by Arrow C, viewing FIG. 1. Because the point 124 moves in a direction which is nearly perpendicular to the slot 126, the lever 114 pivots clockwise on pin 112. If the brake shoes 44 and 46 have worn sufficiently to require an adjustment of strut 62, the pawl edge 136 on lever 114 engages a successive tooth on the ratchet wheel 138. When the brake application is terminated, the strut 62 no longer sustains braking torque. As a result, the spring force provided by spring 128 is sufficient to rotate the ratchet wheel 138 upon the completion of the brake application to adjust the strut 62. Thus, the strut 62 is elongated to maintain a substantially constant clearance between the brake shoes 44, 46, and the brake drum 66.

As the brake shoes 44 and 46 wear, the brake shoes are pivoted radially outwardly as the strut 62 is elongated by mechanism 106 to compensate for this wear. Consequently, the confronting ends 58 of the brake shoes 44 and 46 move toward each other as the brake shoes wear because the trunnion pins 48 are intermediate the confronting brake shoe ends 58 and 60. Because the actuator 68 is received between the confronting brake shoe ends 58, the volume of chamber 76 in the actuator 68 decreases as the brake shoes wear and the confronting ends 58 move toward each other. In other words, the actuator 68 requires progressively less hydraulic fluid as the brake shoes wear. As a result, the brake system of the vehicle upon which the brake 10 is mounted may employ a smaller brake fluid reservoir than has been acceptable with prior drum brakes because the reservoir need not provide for worn lining fluid as with prior drum brakes.

Viewing FIG. 3, a parking brake application is effected by a parking brake cable (not shown) pivoting the lever 94 clockwise about the screw 96. The parking lever 94 engages the brake shoe 46 at the abutment 98 to urge the brake shoe radially outwardly into engagement with the brake drum 66. Reaction forces acting through the screw 96 and the housing 70 of actuator 68 force the brake shoe 44 into engagement with the brake drum 66.

Upon inspection of the drawing Figures, it will be apparent to those skilled in the art to which the invention pertains that the invention embodies many manufacturing advantages. For example, the backing plate 12 is symmetrical about a vertical plane parallel to the axis of axle 14, viewing FIG. 1. The flange 108 defines an ear 140 opposite the ear 110. A pin 112 may be provided in the ear 140 so that the brake is usable at either the left or right end of an axle assembly. Further, because the backing plate 12 is symmetrical, the members 18 and 20 may be identical stampings. The identical stampings may be placed back-to-back to form the backing plate 12.

A further manufacturing economy results from the design of the parking brake lever 94. Because the end 102 of the lever 94 is offset both axially and circumferentially with respect to the pin 96, the parking brake may be actuated by a cable pull either axially (downward in FIG. 3) or circumferentially (leftward in FIG. 3).

I claim:
1. In a drum brake of the type including a pair of arcuate brake shoes carried on a backing plate, said brake shoes being movable into engagement with a rotatable brake drum to effect a brake application to retard rotation of said brake drum, said backing plate including a pair of radially extending plates, each of said plates having a plurality of circumferentially spaced arms extending radially therefrom, said plates being secured to one another so that the arms of one plate are axially spaced from and circumferentially coincident with the arms of the other plate so as to define circumferentially spaced pairs of radially-extending arms, said brake shoes being slidably received between said arms, characterized in that two circumferentially adjacent pairs of said arms define a circumferentially-extending recess therebetween, said circumferentially-extending recess receiving a hydraulic actuator engaging said brake shoes to effect a brake application, said hydraulic actuator cooperates with said brake shoes to always remain spaced from said plates, said hydraulic actuator pivotally carries a parking lever engageable with one of said brake shoes and pivotally engaged to said hydraulic actuator at a location spaced axially outwardly from the engagement with said one brake shoe, said one brake shoe defining a confronting end engaging said hydraulic actuator and a portion radially spaced and circumferentially in alignment with said confronting end, said parking lever forms an abutment engageable with said portion to move said one brake shoe during a parking brake application, and said abutment and said portion are disposed within said circumferentially-extending recess.

* * * * *